United States Patent

Smith

[15] 3,644,910

[45] Feb. 22, 1972

[54] READOUT CIRCUITRY WITH COMPENSATION FOR SPEED VARIATIONS

[72] Inventor: Gerald L. Smith, Garden Grove, Calif.

[73] Assignee: Computer Mate, Inc., San Clemente, Calif.

[22] Filed: Sept. 16, 1970

[21] Appl. No.: 72,784

[52] U.S. Cl. ............................................ 340/174.1 H
[51] Int. Cl. ............................................ G11b 5/02
[58] Field of Search ...........340/174.1 A, 174.1 B, 174.1 H

[56] References Cited

UNITED STATES PATENTS

| | | | |
|---|---|---|---|
| 3,412,385 | 11/1968 | Wang et al | 340/174.1 B |
| 3,496,557 | 2/1970 | Lowrance | 340/174.1 B |
| 3,500,362 | 3/1970 | Schmitz | 340/174.1 H |

*Primary Examiner*—Bernard Konick
*Assistant Examiner*—Vincent P. Canney
*Attorney*—Finkelstein and Mueth

[57] ABSTRACT

An improved read control arrangement for reading the binary memory information content in a binary memory information signal independent of the memory medium or receiving device speed variations during the transmission of the binary information signal. A magnetic tape, for example, may have a binary type signal thereon and the tape may be driven by means that imparts variable speed and consequentially, a variable rate of binary signal information transmission from the tape. It will be appreciated that the variations in speed are those that will normally occur due to type of tape drive utilized, variations of tape speed during information write in, and/or the lack of costly devices to ensure a substantially constant speed tape drive. A binary data signal is generated from the binary information on the tape and the binary data signal is applied to a read control means. The read control means receives the binary data signal and is provided with a first sawtooth generator, a sample and hold means, a second sawtooth generator, a signal compare means and a logic control means. The first sawtooth generator commences generating a linearly rising first ramp voltage signal when the binary signal goes from its low value magnitude state condition to its high value magnitude state condition and continues increasing in value throughout the entire high magnitude data signal pulse until it is terminated by the binary data signal going from the high value condition to the low value condition. The magnitude of the first ramp voltage signal from the first sawtooth generator that is achieved at the end of its duty cycle, or ramp rate, when it cuts off, is held by a sample and hold means for a predetermined time period. A second sawtooth generator has a duty cycle, or ramp rate, approximately 150 percent longer than the duty cycle of the first sawtooth generator and is controlled to provide a linearly increasing second ramp voltage output signal commencing at the termination of the first ramp voltage output signal and continuing until the second ramp voltage outlet signal reaches a magnitude that is equivalent to the voltage in the sample and hold means. Both the output signal from the sample and hold means, comprising the peak voltage for the first sawtooth generator and the output signal from the second sawtooth generator are applied to a signal compare means which, for example, may be an operational amplifier. When the second sawtooth generator output signal reaches the voltage value of the sample and hold means output signal the operational amplifier generates a read strobe pulse. The read strobe pulse may be utilized by a computer as a clock pulse reference signal to indicate the precise point of time when the binary information in the binary data signal may be read to obtain a correct reading of the information thereon. Appropriate controls are provided to recycle the two sawtooth generators and the sample and hold means after each cycle of operation.

17 Claims, 4 Drawing Figures

INVENTOR
GERALD L. SMITH
BY Finkelstein & Mueth
ATTORNEYS

INVENTOR
GERALD L. SMITH
BY Finkelstein & Mueth
ATTORNEYS

INVENTOR
GERALD L. SMITH
BY
Finkelstein & Mueth
ATTORNEYS

BACKGROUND OF THE INVENTION

FIELD OF THE INVENTION

This invention relates to the binary signal detection art and more particularly to an improved read control for a binary encoded data information signal wherein the variations in the rate at which the binary information is transmitted does not affect the accuracy of the data detection.

DESCRIPTION OF THE PRIOR ART

In prior art applications of binary signal encoding, for example on a magnetic tape, there are several general encoding formats that have been utilized extensively in the past. One of these encoding formats is an NRZI type encoding utilizing two tracks. When the NRZI format has been utilized, the speed control of the tape when it is desired to readout the binary information that has been encoded must be comparatively precise. That is, no greater deviations than, for example, approximately ±5 percent in the speed control can be tolerated or else erroneous or no data will be obtainable.

Another type of encoding often utilized is generally termed a bi-phase encoding. While this utilizes only one track it is, approximately, a frequency modulated type of binary signal and, consequently, the speed control on the tape when it is desired to read the tape must be even more precisely controlled than with the NRZI format. In by-phase encoding, speed controls on the tape for reading the information encoded thereon are generally maintained to a value within, for example, approximately ±2 percent.

It will be appreciated that providing the speed controls and/or the drive arrangements for achieving such very high accuracy of drive speeds is not only expensive but offers a high degree of complexity of the system design, in the system maintenance and in the system utilization. Therefore, in order to minimize cost and complexity, it has long been desired to provide an encoding and readout arrangement in which variation in the speed at which binary data is transmitted has substantially no effect.

In general, the effect of variable data transmission rate can result from two primary sources. One of these sources is the variation in speed with which the binary data is encoded onto the tape. With this source of speed variation in the encoding, even constant tape speed drive during readout provides a variable speed binary data transmission. The other major source of speed variation is an actual variation in the tape speed during readout. When the source of speed variation is the actual variation in the speed of the tape during readout, even the most precisely controlled speed on encoding the binary data information onto the tape still would result in a variable binary data information transmission rate.

Thus, in prior readout systems it generally was necessary to provide some compensation for the variable data transmission rate. Where speed control of the tape, either during encoding or readout has been attempted, often very expensive and high precision motors were utilized in the tape drive in order to provide a constant output speed from the motor. That is, motors providing a speed regulation within ±2 percent or ±5 percent of a nominal rated speed thereof are comparatively expensive. Even motors having an output speed that is regulated within ±10 percent of the nominal rated speed are comparatively expensive.

Other types of speed control have also been proposed and/or utilized in prior art tape drive systems. Such arrangements went beyond merely accepting the output speed from a comparatively expensive motor that actually sought to control the speed of the motor to a particular value. In order to achieve such control it was necessary to provide a control system wherein a first information signal had a measurable characteristic that was indicative of the desired speed. A second information signal had to be generated, which second information signal had a similar measurable characteristic that was indicative of the actual speed of the motor. These two signals were compared and an error signal having a magnitude or other characteristic proportional to the difference therebetween was generated and this error signal then utilized to effect a control of the actual speed of the motor. Naturally, such speed control systems were comparatively expensive and are generally not compatible with the less expensive tape drive casettes or other similar units presently being utilized by many computers.

It has also been long desired to provide such an encoding format on tape and a read control arrangement such that even gross variations, on the order of 150 to 300 percent of the nominal speed, do not affect the accuracy of the data readout or data detection.

SUMMARY OF THE INVENTION

Accordingly, it is an object of the present invention to provide an improved binary data detection arrangement.

It is another object of the present invention to provide an improved binary data information detection arrangement that is substantially independent of the variations in the speed with which the binary information is being detected or the rate of transmission thereof.

While, for convenience, there is described the utilization of the present invention in an embodiment utilizing a magnetic tape, it will be appreciated that the present invention is not so restricted. Rather, the present invention may equally well be utilized with magnetic discs, magnetic drums, or optical or other means that provide a binary or two-valued system having an information content represented by known sequential combinations of the two values.

The above and other objects of the present invention are achieved, in accordance with the principles of the present invention, by providing a readout system that automatically reads the binary information content on a binary data signal at whatever speed of data transmission may be occurring during readout. That is, variations in the rate of binary data transmission are automatically and completely compensated by the readout arrangement of the present invention by providing a pulse reference or clock signal that may be utilized to provide a precise time when the value of the binary information signal may be detected to provide detection of the particular binary value. That is, if the rate of binary data transmission decreases then there is a longer time between the reference clock pulses and, as the speed increases, the time periods between clock pulses become correspondingly shorter. Thus, the present invention does not need nor require any form of speed control during either the encoding or readout phases since variations in the binary data information transmission rate do not effect the accuracy of readout. It will be appreciated that with the comparatively high density bit encoding, for example on the order of 800 to 1600 bits per inch of tape, it is substantially physically impossible to have gross speed variations occurring between adjacent pulses. That is, the angular momentum of the tape drive arrangements as well as the structural integrity of the tape resisting acceleration forces prevent such large speed changes in such comparatively small time periods. While the speed during data transmission may vary considerably, for example four, five or six hundred percent, such variations in speed occur comparatively slowly between adjacent pulses when compared with the high density data bit encoding.

The binary information that is encoded on the tape may be, for example, of the type that nominally has an uniform pulse width for the high value magnitude state binary signal condition and the spacing therebetween at the low value magnitude state of the binary signal condition contains the binary information. However, the above-mentioned sources of data information transmission rate variations result in an effect analogous to a variable pulse width during the readout.

With high data bit encoding densities, though, there is not gross variations in the detected pulse width between adjacent bits.

In magnetic tape systems the information is generally encoded on the tape by a write control arrangement through a write head. When it is desired to utilize the information so encoded on the tape by, for example, a computer, the tape is passed in front of a read head that is connected to a read amplifier. The read amplifier reconstructs, for example, the magnetic pulse on the tape and provides a signal representative thereof to a peak detector. The read amplifier, read head and peak detector may, for convenience, be generally termed a data signal generating means since the peak detector provides, as its output signal, a binary data signal that is applied to the read control of the present invention.

In the read control there is a first sawtooth generator having a first duty cycle for providing a first ramp voltage output signal. The first sawtooth generator has generally two portions: a first portion for generating the first ramp voltage output signal and a second portion for controlling the first duty cycle of the first sawtooth generator. The first duty cycle of the first sawtooth generator provides a beginning of the ramp voltage output signal for the condition of the binary data signal changing from the low level binary condition to the high level magnitude binary condition. The first ramp voltage from the first sawtooth generator continues to increase linearly as long as the data signal is at the high magnitude binary condition. When the data signal makes the transition from the high magnitude binary condition to the low level binary condition the duty cycle control turns off the first sawtooth generator.

A sample and hold means is provided for receiving the first ramp voltage output signal from the first sawtooth generator and the sample and hold means provides an output signal that, during the linear rise time of the first sawtooth generator, has a voltage at least as great as the first ramp voltage output signal and when the maximum first ramp voltage output signal is reached at the end of the first duty cycle, the sample and hold output signal maintains a voltage value that is directly proportional to the maximum first ramp voltage value during a second portion of its operation and applies this sample and hold output signal to a signal compare means. Thus, it will be appreciated, that the maximum voltage achieved by the first ramp voltage output signal is a function of the rate at which the binary data tape was moving since the speed of the tape will determine the time period for which the data signal is at the high magnitude condition. The faster the tape speed the shorter will be the time of this pulse, and all of the pulses, and the slower the tape speed the longer will be the time of this pulse and other pulses from the tape.

A second sawtooth generator is also provided and the second sawtooth generator also has a second duty cycle that has a duration approximately 150 percent of the duration of the first sawtooth generator to the cycle. The second sawtooth generator also has a first portion for generating a second ramp voltage output signal and a second duty cycle control portion for starting and stopping the generation of the second ramp voltage output signal. In this embodiment of the invention, the second ramp voltage output signal from the second sawtooth generator is initiated by its duty cycle to start increasing linearly for the condition of the binary data signal decreasing from the high binary value to the low binary value and the second sawtooth generator continues to generate an increasing voltage first ramp voltage output signal until the magnitude thereof reaches the magnitude achieved by the voltage of the first ramp voltage output signal at the end of its duty cycle as held in the sample and hold output signal. The output signal from the second sawtooth generator is also fed to the signal compare means which, for example, may be an operational amplifier, and when the voltage value of the second sawtooth generator output signal is the same as the sample and hold output signal value the signal compare means generates a read strobe pulse. The read strobe pulse is provided to the computer or utilizer and indicates the precise time when the data signal should be read to determine the appropriate binary signal thereon. Thus, the second ramp voltage output signal from the second sawtooth generator reaches its peak voltage which is equivalent to the voltage in the sample and hold output signal approximately a pulse and a half after the change of the binary data signal from the high magnitude to the low magnitude condition. This time period is when the read strobe pulse from the signal compare means is generated and corresponds to approximately the center of the next data pulse position in the binary data signal, whether it is the high magnitude, which may indicate a binary one, or the low magnitude condition, which may indicate a binary zero. Thus, the duration of the second duty cycle for the second sawtooth generator may be, for example, as much as ±30 percent deviation from the 150 percent of the first duty cycle or 120 percent to 180 percent thereof, depending on the high voltage limits of the sawtooth generators. This will still provide the read strobe pulse within the data signal pulse to be read at that particular time. It will be appreciated that this nominal 150 percent ratio of the duty cycle of the second sawtooth generator to the duty cycle of the first sawtooth generator is selected for the expected pulse repetition rate and is utilized as an example herein. Other ratios may be utilized as required for particular data inputs.

The maximum voltage of the sawtooth generators is, in general, a measure of the slowest data rate that may be detectable. Therefore, voltage capability may be selected as desired for individual applications.

A control logic is also provided for generating the appropriate control signals applied to the sample and hold and second sawtooth generator. The control logic receives the data signal as an input as well as the read strobe pulse generates the appropriate control signal in response thereto.

BRIEF DESCRIPTION OF THE DRAWINGS

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Before detailing the description of the preferred embodiments of the present invention, it will be appreciated that the structure and techniques utilized in the present invention may equally well be utilized on any binary or two-valued type of data transmission system. That is, for example, it may be utilized on magnetic tape, magnetic discs, magnetic drums, optical data transmission or other types of data systems. Those skilled in the art may easily determine the particular type of variation necessary to adapt the present invention to such structures. Therefore, the following description of the preferred embodiment of the present invention utilizes, as an example, the application of the present invention to a magnetic tape.

Figure 1:
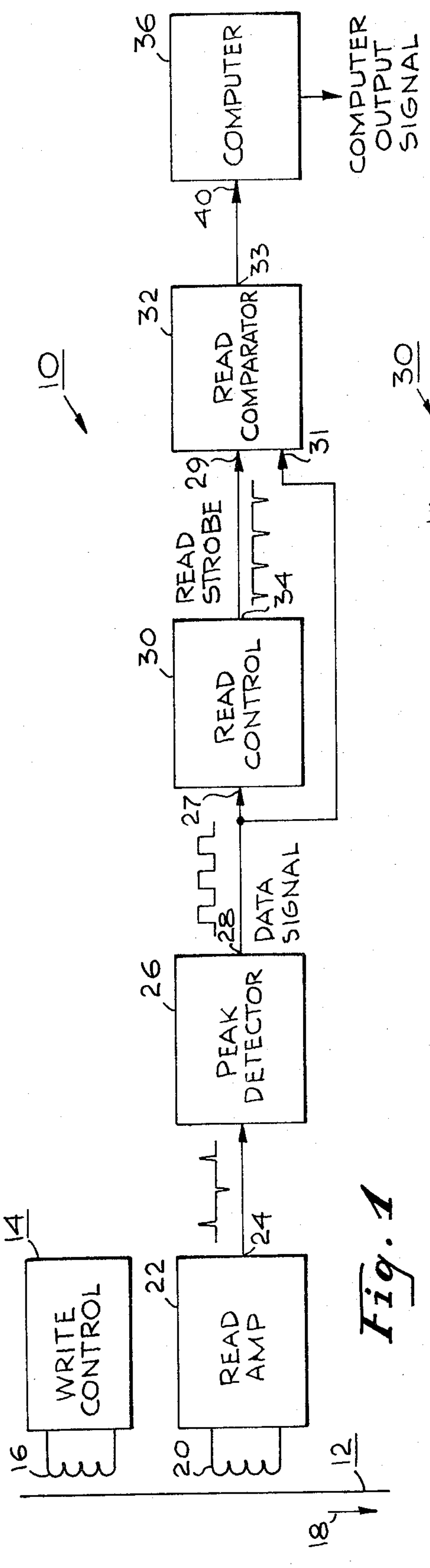
FIG. 1 is a block diagram of a magnetic tape system in which the present invention may be utilized.

As shown in FIG. 1, there is a magnetic tape system, generally designated 10, in which a magnetic tape 12 is provided. There is encoded thereon, by, for example, a write control 14 operating a write head 16 a two-valued or binary information signal. When it is desired to utilize the binary information signal that has been encoded on the magnetic tape 12 the magnetic tape 12 is moved in a direction indicated by the arrow 18 past a read head 20 that is connected to a read amplifier 22. The read amplifier 22 provides an output signal at an output terminal 24 thereof having alternate going spikes, as shown on FIG. 1. This output signal is fed into a detector 26 to provide, at its output terminal 28, a data signal having a two-valued or binary information content therein that is substantially square-wave in form, as shown on FIG. 1. This data signal is fed into the read control 30 at input terminal 27, as well as into a read comparator 32 of data input terminal 31. The read control 30, which in the present invention, provides, at its output terminal 34, a read strobe pulse having the form as shown in FIG. 1 that is also fed to the read comparator 32 at pulse input terminal 29. (The read comparator 32 and the computer 36 are not part of the present invention and are generally part of the computer or utilizer system.) The read strobe pulse provided at the input terminal 29 of the read comparator 32 indicates when the data signal that is provided at the data input terminal 31 to the read comparator 32 should be read to determine the appropriate binary signal. The computer 36 then receives the appropriate binary data signal at its input 40 and provides, in accordance with well known techniques, an appropriate computer output signal at its output terminal 42.

When the tape 12 is not moving at a substantially constant speed, difficulty has been experienced in the past in providing an accurate binary information signal to the computer 36 from the data signal generated at the output of the peak detector 28. Thus, the present invention, in the read control 30, provides means for achieving an accurate indication of the binary content of the data signal despite comparatively gross variations in the speed with which the tape 12 is moving past the read head 20. For example, speed variations as much as 150 to 300 percent have no effect on the accuracy of the binary data signal information that may be provided in the read comparator 32 upon receipt of the read strobe from the output terminal 34 of the read control 30.

Figure 2:
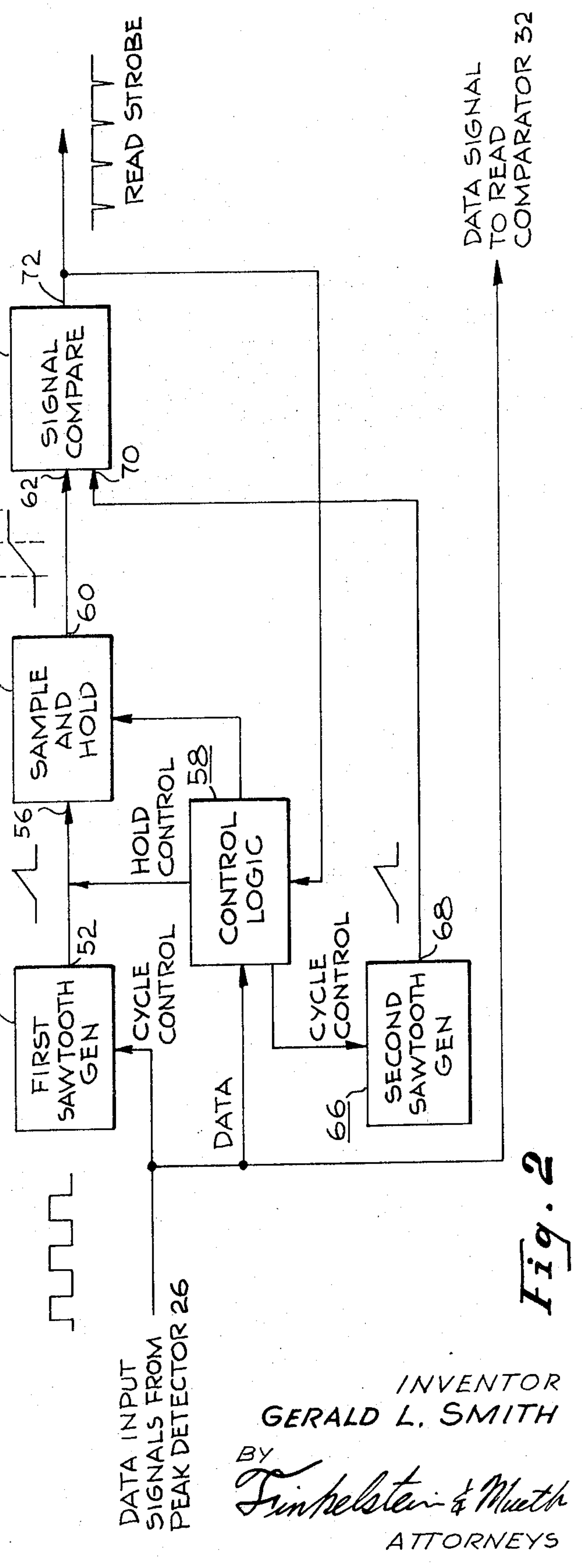
FIG. 2 is a block diagram of a read control arrangement for generating an appropriate read strobe pulse to indicate the time period for reading the data of the data signal.

FIG. 2 is a block diagram of the read control 30 useful in the practice of the present invention. As shown, the read control 30 has a first sawtooth generator 50, that may be considered to be comprised of a first portion for generating a first ramp voltage output signal, and a second or cycle control portion. The data input signal from the peak detector 26 is applied to the first sawtooth generator through the cycle control portion thereof, as explained below in greater detail.

The first ramp voltage output signal is obtained from an output terminal 52 of the first sawtooth generator 50 and the first sawtooth generator 50 has a first duty cycle, or ramp rate, that is controlled by the cycle control portion and the duty cycle duration is equivalent to one pulse width of the data input signal. That is, the cycle control portion starts the first cycle of operation for generation of the first ramp voltage output signal upon the data signal making a transition from its low magnitude condition to its high magnitude condition. The voltage of the first ramp voltage output signal provided by the first sawtooth generator 50 then increases linearly for the entire time period that the data input signal is at its high magnitude condition. When the pulse of high magnitude data signal is over the cycle control portion of the first sawtooth generator 50 terminates the generation of the first ramp voltage output signal and thus an output signal waveform, as shown on FIG. 2, is provided at the output terminal 52.

The first ramp voltage output signal is applied to a sample and hold means 54 at an input terminal 56 thereof. The sample and hold means 54 also receives a hold control signal from a control logic means 58. The hold control signal is utilized in the sample and hold 54 to provide an output signal and at output terminal 60 thereof that has a first portion wherein the magnitude of the sample and hold means 54 output signal is at least as great as the magnitude of the first ramp voltage output signal, as shown by portion *a* of the waveform on FIG. 2, and a second portion, having a predetermined duration, indicated by the portion *b* on FIG. 2 wherein the voltage is equivalent to the peak voltage achieved by the first ramp voltage output signal at the termination of its duty cycle. The sample and hold means 54 output signal at the output terminal 60 thereof is then fed to a first input terminal 62 of a signal compare means 64.

A second sawtooth generator 66 is also provided and the second sawtooth generator has a second duty cycle, or ramp rate, that has a longer duration than the first duty cycle for the first sawtooth generator 50. For example, with the first duty cycle and, as noted above, the duration of the first duty cycle is equivalent to the pulse duration of the high magnitude data input signal pulse. The duration of the second duty cycle may be approximately 150 percent of the duration of the first duty cycle. As discussed below in greater detail in connection with FIG. 4, it has been found that between 120 percent and 180 percent increase in duration is acceptable for satisfactory operation in the present invention. The second sawtooth generator 66 may also be considered to be comprised of a second ramp voltage output signal generating portion and a second cycle control portion. The second cycle control portion receives an appropriate control signal from the control logic 58 and, in this embodiment of the invention, initiates the generation of the second ramp voltage output signal for the condition of the data input signal changing from its high magnitude condition to its low magnitude condition. This is the time when the first sawtooth generator comes to the end of its duty cycle. From this time forward the second sawtooth generator continues to generate its second ramp voltage output signal increasing linearly until the voltage of the second portion *b* of the sample and hold means 54 output signal, which was the maximum voltage achieved by the first ramp voltage output signal at the end of the first duty cycle of the first sawtooth generator, is reached.

The second ramp voltage output signal is transmitted from an output terminal 68 of the second sawtooth generator 66 to a second input terminal 70 on the signal compare means 64. When the second ramp voltage output signal reaches the voltage magnitude of the sample and hold output signal in the second portion thereof, the signal compare means generates a read strobe pulse at its output terminal 72. The read strobe pulse is fed into the logic 58 and allows generation of the appropriate cycle control signal to be sent to the second sawtooth generator 66 to terminate the generation of the second ramp voltage output signal, as well as a reset control signal applied to the sample and hold 54 to bring the value of the output signal back to its initial level from its level indicated by the portion *b*.

Thus, the read strobe pulse occurring, as it does, upon the second ramp voltage output signal reaching the same value as the first ramp output voltage signal reached at its maximum position, the read strobe pulse is substantially in the middle of the next appropriate binary data pulse, whether a binary zero or a binary one. This is, a high or a low magnitude condition, and reading of the data signal at this particular instant of time of each read strobe pulse provides an accurate time for reading the data and is completely independent of the speed of the tape 12. Variations in the speed of the tape 12 merely increase or decrease the voltage level reached by the first ramp voltage output signal and, consequently, the voltage reached by the second ramp voltage output signal. Therefore, the speed is automatically eliminated as a variable factor in the control circuit and the present invention automatically reads at whatever "speed" the data is being transmitted. Since the data signal is also sent to the read comparator 32 the read strobe pulse allows presentation of the accurate binary information to the computer 36.

Figure 3:
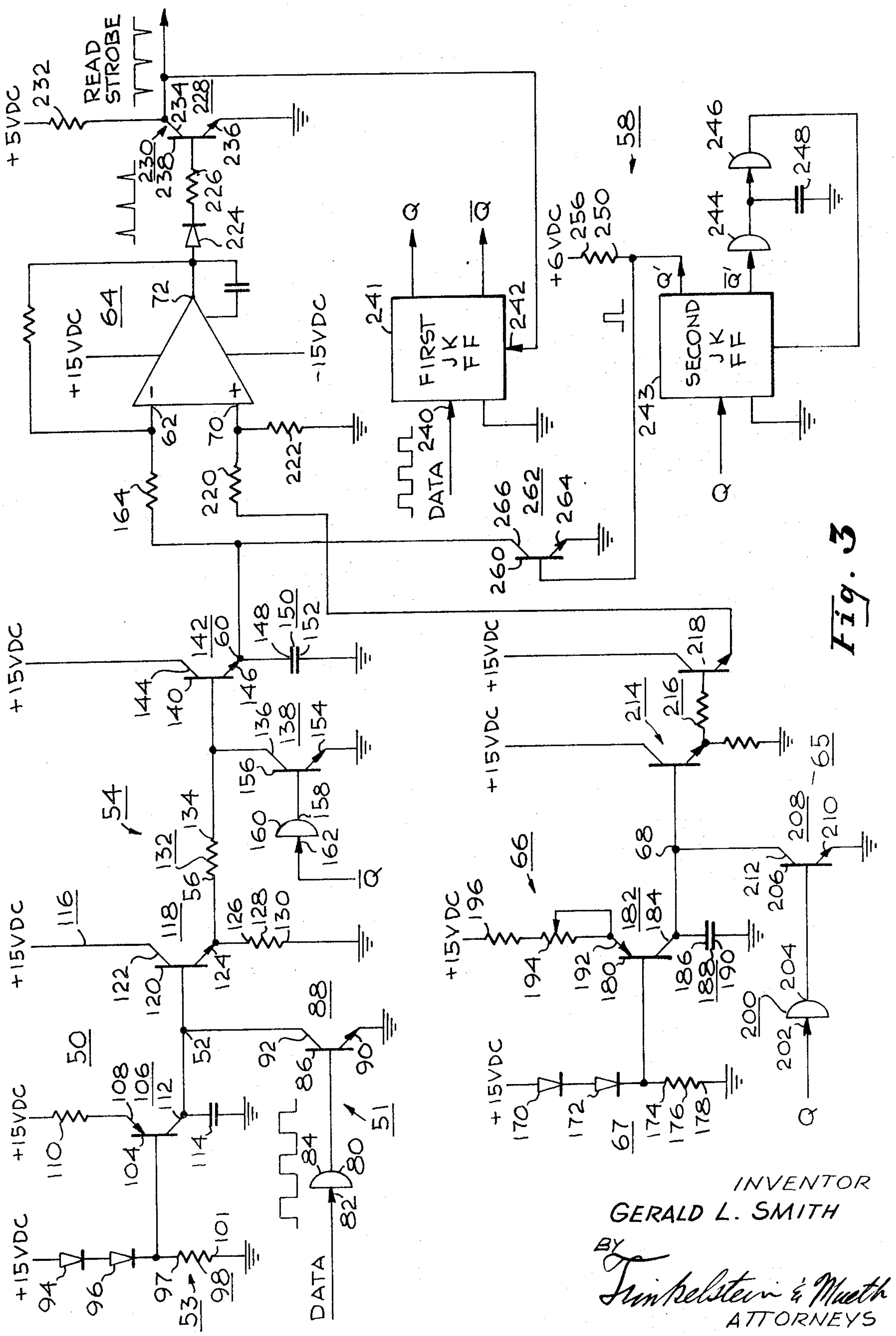
FIG. 3 is a circuit diagram of the read control arrangement shown in FIG. 2.

FIG. 3 illustrates a circuit diagram of the read control 30 illustrated in block diagram form in FIG. 2. As shown on FIG. 3 the first sawtooth generator 50 may be considered to be comprised of a first portion 53 for generating the first ramp voltage output signal applied to the output terminal 52 thereof and a second or cycle control portion 51 for controlling the first duty cycle of the first sawtooth generator 50. The cycle control portion 51 is provided with a gate 80 having an input terminal 82 at which there is applied the binary data input signal from the peak detector 26. The output terminal 84 of the gate 80 is connected to a base electrode 86 of a transistor 88. The emitter electrode 90 of the transistor 88 is connected to ground and the collector electrode 92 is connected to the output terminal 52 of the first sawtooth generator 50.

The first portion 53 of the first sawtooth generator 50 generates the first ramp voltage output signal and is generally comprised of a pair of diodes 94 and 96 connected in series to a resistor 98 at a first end 99 thereof. The second end 101 of the resistor 98 is connected to ground potential. The first end 99 of the resistor 98 is connected to a base electrode 104 of a transistor 106 and the emitter electrode 108 thereof is connected to a resistor 110 that is connected to a predetermined voltage source. The diodes 94 and 96 are also powered by the same preselected voltage source. The collector electrode 112 of the transistor 106 is connected through capacitor 114 to ground potential and is also connected to the output terminal 52 wherein the first ramp voltage output signal is provided. For the configuration shown, it is seen that the gate 80 in the cycle control portion 51 provides that upon an increase of the magnitude of the data input signal applied to the gate thereof from the low magnitude to the high magnitude value the first portion 53 commences the generation of a linearly increasing first ramp voltage output signal which continues until the magnitude of the data pulse applied to the input terminal 82 of the gate 80 changes from the high magnitude condition to the low magnitude condition. This terminates the operation of the first portion 53 and thus ends the first duty cycle.

In preferred embodiments of the present invention it is desired to have an emitter follower buffer and isolation amplifier stage 116 intermediate the first sawtooth generator 50 and the sample and hold means 54 for obvious reasons. The emitter follower buffer and isolation amplifier stage 116 may generally be considered to be comprised of a transistor 118 having its base electrode 120 connected to the output terminal 52 of the first sawtooth generator 50, the collector electrode 122 connected to the predetermined voltage source and the emitter electrode 124 connected to a first end 126 of a resistor 128 having a second end 130 connected to ground potential. Similarly, the emitter 124 of transistor 118 is connected to the input terminal 56 of the sample and hold means 54 which comprises a first end of a resistor 132. The second end 134 of the resistor 132 is connected to both the collector terminal 136 of a transistor 138 and the base electrode 140 of a transistor 142. The collector electrode 144 of the transistor 142 is connected to a predetermined voltage source and the emitter electrode 146 thereof is connected to the output terminal 60 of the sample and hold means 54 and to a first plate 148 of a capacitor 150 having a second plate 152 connected to ground potential.

The emitter terminal 154 of the transistor 138 is connected to ground and the base electrode 156 is connected to the output terminal 158 of a gate 160. The gate 160 has an input terminal 162 that receives a signal designated $\overline{Q}$ generated in the logic means 58 as described below.

The sample and hold means 54 output signal from the output terminal 60 thereof is connected through resistor 164 to the input terminal 62 of the signal compare means 64. The signal compare means may, in this embodiment of the present invention, comprise an operational amplifier and is powered by the preselected DC voltage in both the positive and negative values. For the arrangement of the structure shown in FIG. 3 the input terminal 62 to the signal compare means 64 may be considered the negative input terminal.

The second sawtooth generator 66 is also comprised of a first portion 67 for generating a second ramp voltage output signal at the output terminal 68 thereof and a second portion 65 comprising a second cycle control signal for controlling the second duty cycle of the second sawtooth generator 66. The first portion 67 thereof is substantially identical to the first portion 53 of the first sawtooth generator 50 and as such is comprised of a pair of series connected diodes 170 and 172 connected to a first end 174 of a resistor 176 having a second end 178 connected to ground potential. The first end 174 of the resistor 176 is also connected to the base electrode 180 of a transistor 182. The collector electrode 184 of the transistor 182 is connected to a first plate 186 of a capacitor 188 having a second plate 190 connected to ground potential. The collector electrode 184 is also connected to the output terminal 68 of the second sawtooth generator 66 for generation of the second ramp voltage output signal thereat. The emitter electrode 192 of the transistor 182 is connected to a first variable resistor 194 and a fixed resistor 196 in series therewith that is connected to the preselected positive DC voltage. The variable resistor 194 allows appropriate selection of the duration of the second duty cycle of the second sawtooth generator 66 by controlling the rate at which the magnitude of the second ramp voltage output signal increases with time. The second, or cycle control portion 65 comprising the cycle control portion of the second sawtooth generator 66 is provided with a gate 200 having an input terminal 202 at which is provided a control signal, designated "Q", for the logic section 58. The output terminal 204 of the gate 200 is connected to the base electrode 206 of a transistor 208 that has its emitter electrode 210 connected to ground potential and its collector electrode 212 connected to the output terminal 68 of the second sawtooth generator 66.

A first buffer stage, generally designated 214, which may be substantially identical to the first emitter follower buffer isolation and amplifier 116 described above, a resistor 216 and a transistor 218 are provided, along with a resistor 220 in series between the output terminal 68 of the second sawtooth generator 66 and the second input terminal 70 of the signal compare means 64. The first buffer stage 214, resistor 216, transistor 218 and resistor 220 provide an impedance match for matching the impedance between the output terminal 68 of the second sawtooth generator and the second input terminal 70 of the signal compare means 64 with the impedance between the output terminal 52 of the first sawtooth generator 50 and the first input terminal 62 of the signal compare means 64. The second terminal 70 of the signal compare means 64, which may be considered the positive terminal, is connected to ground through resistor 222. When the voltage magnitude of the sample and hold output signal at the first terminal 62 is equal to the magnitude of the second ramp voltage output signal at the second input terminal 70 of the signal compare means 64 the signal compare means 64 generates a read strobe pulse at its output terminal 72.

The read strobe pulse appearing at the output 72 of the signal compare means 64 is positive going, for the structural arrangement shown in FIG. 3. It is fed into diode 224 that is connected in series with a resistor 226 to an inverter stage 228 that reverses the read strobe pulse from positive going to negative going, which is preferred in many applications. The inverter stage 228 is generally comprised of transistor 230 and resistor 232 connected to the collector electrode 234 thereof. The emitter electrode 236 of transistor 230 is connected to ground potential and the base electrode 238 is connected to the resistor 226. The inverter stage 228 thus reverses the read strobe pulse from positive going to negative going.

The read strobe pulse is applied to the read comparator at the read strobe pulse input terminal 29 thereof and the read comparator 32 also receives the data signal at the data signal input terminal 31 thereof. The read comparator then provides a reading of the data signal at each read strobe pulse. The actual data signal so read is presented at the output terminal 33 for presentation at the input terminal 40 to the computer 36.

The read strobe pulse from the inverter stage 228 is also applied to the logic means 58 in order to generate the appropriate control signal needed for control of the embodiment of the invention shown in FIG. 3. As shown, the logic means 58 is generally comprised of a first JK flip flop that receives the data signal at a first input terminal 240 and the read strobe pulse at a second input terminal 242. The first JK flip flop provides a first output signal generally termed the "Q" signal and a second output signal, generally termed "$\overline{Q}$" output signal. The Q signal is applied to the input terminal 202 of the gate 200 in the second portion 65 of the second sawtooth generator 66 to control the second duty cycle thereof. Thus, the Q signal is present for the time periods between when the data signal decreases from the high magnitude value to the low magnitude value and when the read strobe pulse is generated. This comprises, of course, the duty cycle of the second sawtooth generator 66 as well as being equivalent to the duration of the portion *b* of the sample and hold means 64 output signal (as shown on FIG. 2). The $\overline{Q}$ signal from the first JK flip flop 241 is applied to the input terminal 162 of gate 160 and is the hold control signal from the logic 58.

For the circuit connection arrangment as shown in FIG. 3, during the duration of $\overline{Q}$ the sample and hold means 64 will hold the value of its output signal at the value reached by the first ramp voltage signal at the end of the first duty cycle of the first sawtooth generator 50. The voltage at the resistor 132 causes the voltage to rise at the emitter 146 of transistor 142 and thus provide a charge across the capacitor 150. This charge on the capacitor 150 is the "hold" voltage magnitude of the second portion *b* of the sample and hold means 64 output signal applied at the output terminal 60 during operation thereof. As long as $\overline{Q}$ is present at the input terminal 162 to gate 158 this voltage magnitude will be held, unless the charge on the capacitor 150 is changed. In order to provide the reset control signal from the control logic means 58 for charging the capacitor 150 charge it is preferred to utilize a one-shot dumping arrangement.

The one-shot dumping arrangement generally comprises a second JK flip flop 243 that may be identical to the first JK flip flop 241. A pair of gates 244 and 246 are connected in series at the $\overline{Q}'$ output of the second JK flip flop 243. A capacitor 248 is connected between the gates 244 and 246 for connection to ground potential. The two gates 244 and 246 provide a small, for example, two microsecond delay in the dumping cycle of capacitor 150 before charge is allowed to build up again. This insures a correct voltage value of the "held" signal. (See curves of FIG. 4.) The Q output of second JK flip flop 243, indicated at Q' on FIG. 3, is connected a first end 250 of a resistor 256 connected a positive, preselected voltage. The first end 250 of resistor 256 is also connected to a base electrode 260 of a transistor 262. The emitter electrode 264 of the transistor 262 is connected to ground and the collector electrode 266 is connected to the output terminal 60 of the sample and hold means 54. This Q signal from the first JK flip flop 241 is applied to the second JK flip flop 243 and, upon receipt of the read strobe pulse at the terminal 242 of the first JK flip flop 241 the second JK flip flop 243 dumps the charge on the capacitor 150.

Figure 4:
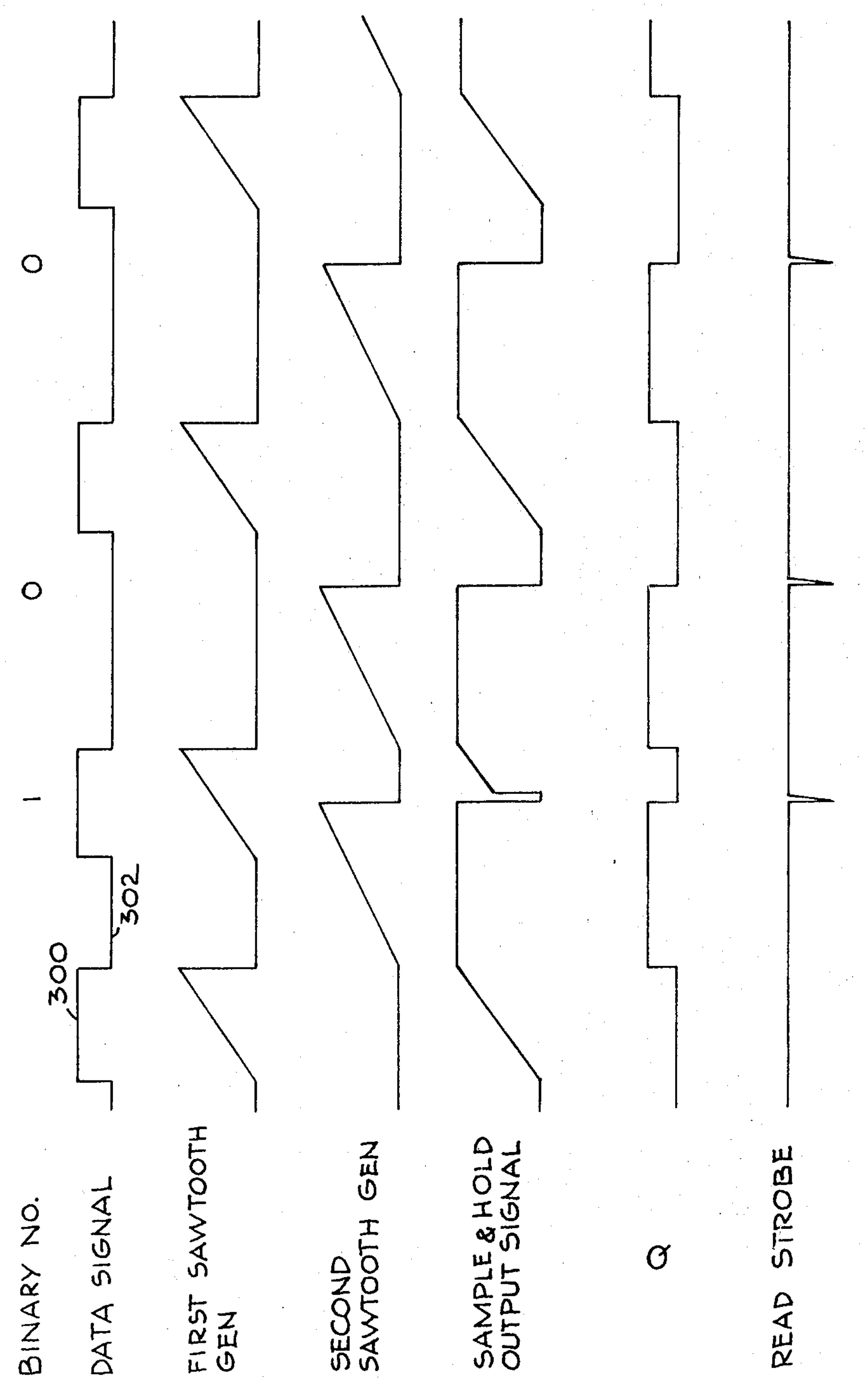
FIG. 4 illustrates various wave forms associated with the embodiment of the invention shown in FIGS. 2 and 3.

FIG. 4 illustrates the waveform, on a time basis, of the various signals associated with the operation of the embodiment shown in FIG. 3. As shown on FIG. 4, the data signal is a two-valued binary data signal having a high magnitude, as indicated at 300, and a low magnitude, as indicated at 302. After the first pulse of the data signal, as shown by the binary number line, a high magnitude indicates a binary number one and a low magnitude indicates a binary number zero when at the appropriate pulse duration.

As shown, when the first sawtooth generator starts its first duty cycle at the onset of the high magnitude condition of the data signal, it continues to rise linearly in voltage value until the end of the first data pulse when the data signal drops from the high magnitude at 300 to the low magnitude at 302. This terminates the first duty cycle of the first sawtooth generator. Each time the data pulse makes a transition from the lower magnitude 302 to the upper magnitude 300 the first sawtooth generator comes on and stays on, increasing the first ramp voltage output signal linearly until the data signal decreases from the high magnitude 300 to the lower magnitude 302.

The second sawtooth generator is cycled to commence the linear increase of the second ramp voltage output signal for approximately a 150 percent cycle duration, that is, 150 percent ramp rate, compared with the first duty cycle of the first sawtooth generator and rises linearly until the same voltage magnitude is achieved as was achieved by the first ramp voltage output signal at the end of the first duty cycle. Since the duration is approximately 150 percent, it can be seen that the two voltages are equal at about the time of the middle of the data pulse. Thus, even a variation of ±30 percent, that is a duty cycle of 120 percent to 180 percent of the first duty cycle, will still provide this voltage equivalent during the very next data signal binary number. Since this also corresponds to the point where the read strobe pulse is generated it can be seen that the read strobe pulse is generated as a clock pulse and indicates to the user that the data signal should be read at this particular time to provide the binary number.

The sample and hold means 64 output signal is also shown on FIG. 4 and as shown it increases with the linear increase in the first ramp voltage output signal from the first sawtooth generator until the peak voltage is achieved and then maintains that voltage until the read strobe pulse. As noted above, the small delay provided by the gates 244 and 246 on the second JK flip flop 243 provide a slight, for example, two microsecond delay to insure complete dumping of the charge on the capacitor 150. Then the sample and hold means output signal is immediately programmed to the value of the first sawtooth generator output signal. Thus, the sample and hold means 64 output signal always has a value that is equal to or greater than the first sawtooth generator. The only time when it may be less is in the instant of time of the small delay noted above to insure dumping of the capacitor 150.

The Q signal waveform from the first JK flip flop 241 is also shown on FIG. 4 and as can be seen it is present between the end of the first duty cycle and actuation of the read strobe pulse.

Thus, as can be seen from FIG. 4, if the speed of the tape 12 (shown in FIG. 1) varies (or data transmission rate varies for any reason), the length of pulse duration in the data signal is proportionately increased or decreased. This merely increases or decreases the time during which the first and second sawtooth generators are operative. Their functional points remain in exact correspondence. Therefore, the read strobe pulse is always provided at a particular time, as a clock pulse, when the binary information may be read from the data signal.

This concludes the description of applicant's improved read control arrangement for binary information signals. From the above, those skilled in the art may find many variations and adaptations of the present invention. The following claims are intended to cover all such variations and adaptations falling within the true scope and spirit of the invention.

What is claimed is:

1. A read control arrangement of the type adapted to provide sequential detection of binary information in a binary encoded data signal substantially independent of variation in the rate of data information transmission and providing a read strobe pulse corresponding to a particular time at which the binary data is to be sensed, and comprising, in combination:

information signal generating means for providing a binary information signal having high magnitude and low magnitude binary data signal conditions;

data signal generating means receiving said binary information signal and generating a substantially squarewave binary data signal in response thereto and said binary information signal having a high magnitude data signal condition and a low magnitude data signal condition and predetermined pulse widths thereof for establishing a binary one and binary zero condition;

a read control means comprising:

a first sawtooth generator reveiving such data signal from said data signal generating means, and having a first predetermined duty cycle and ramp rate, and having a first portion for generating a first ramp voltage output signal having a first ramp voltage magnitude at the beginning of each of said first duty cycles and increasing linearly to a second ramp voltage magnitude greater than said first ramp voltage magnitude at the end of each of said first duty cycles, and said first duty cycle having a duration substantially corresponding to said predetermined pulse widths of said data signal, and a second portion comprising cycle control means for starting said first duty cycle for the condition of said data signal, and a second portion comprising cycle control means for starting said first duty cycle for the condition of said data signal increasing from said low magnitude binary condition to said high magnitude binary condition, and terminating said first duty cycle for the condition of said data signal decreasing from said high magnitude binary condition to said low magnitude binary condition;

a sample and hold means for receiving said first ramp voltage output signal and providing a sample and hold output signal having a first portion thereof substantially at least as great as said magnitude of said first ramp voltage output signal, and a second portion thereof having a magnitude corresponding to said second magnitude of said first ramp voltage output signal, and said second portion of said sample and hold output signal having a preselected duration after termination of said first duty cycle;

a second sawtooth generator having a second duty cycle and ramp rate having a second duration longer than said duration of said furst duty cycle and having a first portion for generating a second ramp voltage output signal having said first ramp magnitude at the beginning of each of second duty cycles and said second ramp voltage signal magnitude of said first ramp voltage output signal at the end of each of said second duty cycles, and a second portion comprising second duty cycle control means for starting and stopping said second duty cycle at predetermined time intervals;

logic means receiving said data signal for generating a plurality of control signals;

a first of said plurality of control signals applied to said sample and hold means for starting said second portion of said sample and hold output signal;

a second of said plurality of control signals applied to said second sawtooth generator for controlling said second duty cycle of said second sawtooth generator to start said second duty cycle for the condition of said data signal decreasing from said high magnitude binary condition to said low magnitude binary condition, and terminating said second duty cycle for the condition of said second ramp voltage output signal having a magnitude equal to said second ramp signal magnitude of said first ramp voltage output signal;

a third of said plurality of said control signals for terminating said second portion of said sample and hold output signal and said predetermined time period of said second portion of said sample and hold output signal corresponds to said duration of said second duty cycle;

signal compare means for receiving said sample and hold output signal and said second ramp voltage output signal, and providing an output read strobe pulse for the condition of said magnitude of second ramp voltage output signal substantially identical to said magnitude of said sample and hold output signal; and said logic means receives said read strobe pulse for generating said plurality of control signals.

2. The arrangement defined in claim 1 wherein said logic means further comprises: delay means for providing a predetermined time delay between immediately successive sample and hold output signals.

3. The arrangement defined in claim 2 wherein said logic means further comprises: a first JK flip flop for receiving said data signal and said read strobe pulse signal, and providing a $\overline{Q}$ output signal for said first control signal for said plurality of control signals of said logic means, and a Q output signal for said second control signal of said plurality of control signals of said logic means.

4. The arrangement defined in claim 3 wherein said logic means further comprises:

a second JK flip flop for receiving said Q output signal from said first JK flip-flop, and said second JK flip flop connected to said sample and hold means; and a pair of gates connected in series to said second JK flip flop for providing said preselected time delay.

5. The arrangement defined in claim 4 wherein:

said signal compare means comprises an operational amplifier;

said sample and hold means further comprises:

a first resistor having a first end connected to said first sawtooth generator for receiving said first ramp voltage output signal therefrom;

a capacitor having a first plate connected to ground potential, and a second plate;

a first transistor having a base, emitter and collector electrodes, and said base electrode coupled to second end of said first resistor, said collector electrode connected to a predetermined voltage source and said emitter electrode coupled to said second plate of said capacitor; and said logic means coupled to said emitter electrode of said first transistor to provide said third control signal thereat.

6. The arrangement defined in claim 5 wherein said sample and hold means further comprises:

a second transistor having base, emitter and collector electrodes, said collector electrode of said second transistor connected to said base electrode of said first transistor, and said emitter electrode of said second transistor connected to ground potential;

a gate having an input terminal for receiving said Q signal for said first control signal thereat and an output terminal connected to said base electrode of said second transistor;

whereby, voltage at said first resistor charges said capacitor to provide said second portion of said sample and hold output signal, and said third control signal discharges said capacitor for the condition of said read strobe pulse applied to said first JK flip flop thereby to terminate said second portion of said sample and hold output signal.

7. The arrangement defined in claim 6 wherein said logic means further comprises: a third transistor having base, emitter and collector electrodes, said collector electrode of said third transistor connected to said second capacitor plate of said capacitor and to said emitter electrode of said first transistor, said emitter electrode of said third transistor connected to ground potential, and said base electrode of said third transistor connected to said second JK flip flop.

8. The arrangement defined in claim 7 and further comprising:

an emitter follower, buffer and isolation amplifier means intermediate said first sawtooth generator and said first resistor, and comprising:

a fourth transistor having base, emitter and collector electrodes, said base electrode of said fourth transistor connected to said first sawtooth generator for receiving said first ramp voltage output signal therefrom, said emitter electrode of said fourth transistor connected to said first end of said first resistor for transmitting said first ramp voltage output signal thereto, and said collector electrode of said fourth transistor connected to a predetermined voltage source; and a ground resistor having a first end connected to said emitter electrode of said fourth transistor, and a second end connected to ground potential.

9. The arrangement defined in claim 8 and further comprising: impedance matching means intermediate said second sawtooth generator and said signal compare means for providing an impedance therebetween substantially the same as the impedance between said first sawtooth generator and said signal compare means.

10. The arrangement defined in claim 9 wherein: said second duty cycle has a duration within the range of 120 percent to 180 percent of the duration of said first duty cycle.

11. The arrangement defined in claim 9 wherein: said second duty cycle has a duration of approximately 150 percent of said first duty cycle.

12. The arrangement defined in claim 6 wherein:

said cycle control portion of said second sawtooth generator further comprises a gate having an input terminal for receiving said Q signal from said first JK flip flop, and an output terminal;

a fifth transistor having base, emitter and collector electrodes and said base electrode of said fifth transistor connector to said output terminal of said gate, said emitter electrode of said fifth transistor connected to ground potential, and said collector electrode of said fifth transistor connected to said ramp voltage generating portion of said second sawtooth generator.

13. The arrangement defined in claim 12 wherein said cycle control portion of said first sawtooth generator comprises:

a gate having an input terminal for receiving said data signal thereat, and an output terminal;

a sixth transistor having a base, emitter and collector electrode and said base electrode of said sixth transistor connected to said output terminal of said gate, said emitter electrode of said sixth transistor connected to ground potential, and said collector electrode of said sixth transistor connected to said ramp voltage generating portion of said first sawtooth generator.

14. A read pulse reference signal generating arrangement for providing a read pulse reference signal for a binary encoded data signal wherein the binary encoded data signal has a high magnitude condition, a low magnitude condition, predetermined magnitude transitions from said high magnitude condition to said low magnitude condition, and from said low magnitude condition to said high magnitude condition, and pulse widths between said transitions, comprising, in combination:

read control means for receiving said binary encoded data signal and generating said read pulse reference signal at preselected intervals corresponding to preselected points on said binary data encoded signal, and comprising:

first means for repetitively generating a first voltage signal increasing, at a first rate, from a first voltage level, for the condition of a first magnitude transition of said binary data signal, to a second voltage level, for the condition of a second magnitude transition, different from said first magnitude transition of said binary data signal, and decreasing from said second voltage level to said first voltage level at said second magnitude transition of said binary data signal;

second means for repetitively generating a second voltage signal, increasing at a second rate greater than said first rate, from a third voltage level at said second magnitude transition of said binary data signal, to a fourth voltage level, and said fourth voltage level has a predetermined ratio to the voltage difference between said first voltage level and said second voltage level of said first voltage signal;

third means for comparing said second voltage level reached by said first voltage signal with said fourth voltage level reached by said second voltage signal and generating said read pulse reference signal for the condition of said fourth voltage level having a preselected ratio to the second voltage level.

15. The arrangement defined in claim 14 wherein said first first voltage level and said third voltage level are substantially identical, and said second voltage level is substantially identical to said fourth voltage level.

16. The arrangement defined in claim 15 wherein:

said first magnitude transition of said binary data signal corresponds to a transition from said low magnitude condition to said high magnitude condition thereof and said second magnitude transition corresponds to a transition from said high magnitude to said low magnitude thereof; and said preselected voltage difference between said first level and said second level of said first voltage reference signal is substantially equal to the preselected voltage difference between said third voltage level and said fourth voltage level of said second voltage signal.

17. The arrangement defined in claim 16 wherein:

said first means comprises a first sawtooth generator;

said second means comprises a second sawtooth generator, and said increase of said first voltage signal and said increase of said second voltage signal are linear increases with time.